(12) United States Patent
Bhojkumar et al.

(10) Patent No.: US 11,818,783 B2
(45) Date of Patent: Nov. 14, 2023

(54) IDENTIFYING NEW RADIO COVERAGE AVAILABILITY IN NON-STANDALONE MODE

(71) Applicant: Apple Inc., Cupertino, CA (US)

(72) Inventors: Divyaprakash P. Bhojkumar, Cupertino, CA (US); Ajay Singh, San Jose, CA (US); Arun G. Mathias, Los Altos, CA (US); Carola Faronius, Cupertino, CA (US); Faraz Faheem, Santa Clara, CA (US); Lakshmi N. Kavuri, Cupertino, CA (US); Madhusudan Chaudhary, Campbell, CA (US); Muthukumaran Dhanapal, Dublin, CA (US); Raghuveer Mallikarjunan, Sunnyvale, CA (US); Rajesh Ambati, Los Altos Hills, CA (US); Rohan C. Malthankar, San Jose, CA (US); Sreevalsan Vallath, Dublin, CA (US); Thanigaivelu Elangovan, Cupertino, CA (US); Vivek Ramanna, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/905,568

(22) Filed: Jun. 18, 2020

(65) Prior Publication Data

US 2021/0400754 A1    Dec. 23, 2021

(51) Int. Cl.
| | |
|---|---|
| *H04W 76/16* | (2018.01) |
| *H04W 48/16* | (2009.01) |
| *H04W 76/27* | (2018.01) |
| *H04W 56/00* | (2009.01) |
| *H04W 36/00* | (2009.01) |
| *H04W 64/00* | (2009.01) |
| *H04W 88/06* | (2009.01) |

(52) U.S. Cl.
CPC ....... *H04W 76/16* (2018.02); *H04W 36/0058* (2018.08); *H04W 48/16* (2013.01); *H04W 56/0045* (2013.01); *H04W 64/003* (2013.01); *H04W 76/27* (2018.02); *H04W 88/06* (2013.01)

(58) Field of Classification Search
None
See application file for complete search history.

(56) References Cited

U.S. PATENT DOCUMENTS

| | | | |
|---|---|---|---|
| 2012/0139790 A1* | 6/2012 | Wirola ................. | H04W 76/50 342/385 |
| 2014/0206341 A1* | 7/2014 | Siomina ............ | H04W 36/0085 455/422.1 |
| 2016/0337984 A1* | 11/2016 | Takeda ................. | H04W 52/08 |
| 2019/0166549 A1* | 5/2019 | Ahmavaara ......... | H04W 72/085 |

(Continued)

*Primary Examiner* — German Viana Di Prisco
(74) *Attorney, Agent, or Firm* — Fay Kaplun & Marcin, LLP

(57) ABSTRACT

The exemplary embodiments relate to a user equipment configured to connect to a network that supports simultaneous connection to a first radio access technology (RAT) and a second RAT. The UE may receive coverage information associated with the first RAT and a cell of the second RAT, receive an indication of the current UE location relative to the cell of the second RAT and determine whether the first RAT is available for camping based on the coverage information and the indication of the current UE location relative to the cell of the second RAT.

15 Claims, 6 Drawing Sheets

(56) References Cited

U.S. PATENT DOCUMENTS

| | | | | |
|---|---|---|---|---|
| 2019/0274097 A1* | 9/2019 | Hietalahti | ......... | H04W 52/0212 |
| 2020/0107367 A1* | 4/2020 | Weisbrod | ............. | H04W 76/27 |
| 2020/0344694 A1* | 10/2020 | Jangid | .................... | G06N 20/00 |
| 2021/0075901 A1* | 3/2021 | Ahluwalia | ............ | H04W 76/10 |
| 2021/0250796 A1* | 8/2021 | Kim | ....................... | H04B 17/27 |

* cited by examiner

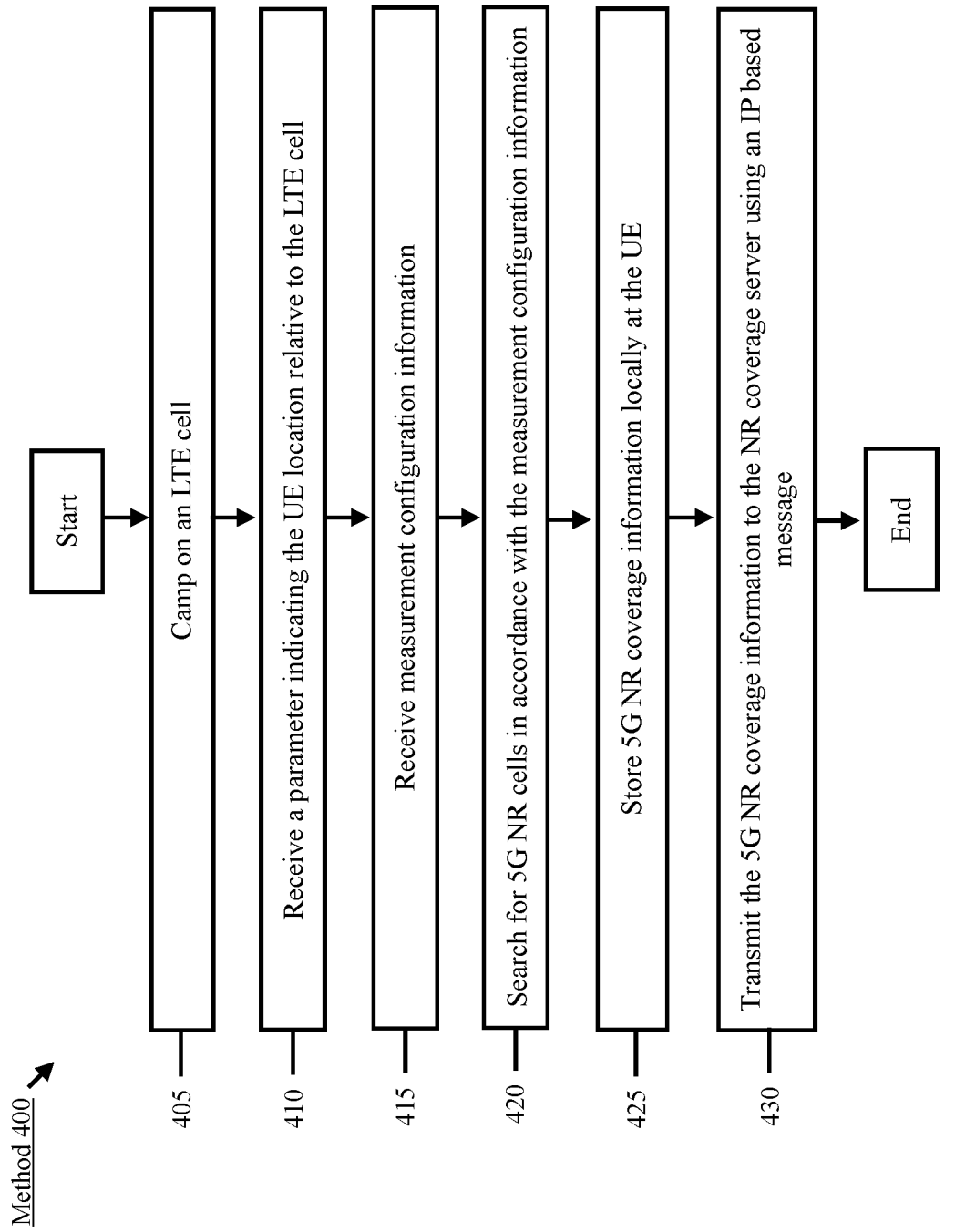

Database 500

| | Cell ID 505 | Timing Advance Command Value Associated With a B1 Event 510 | Timing Advance Command Value Associated With No B1 Event 515 | UE Action 520 |
|---|---|---|---|---|
| 501 | eNB 120A | 0.5 | | No special handling |
| 502 | eNB 120A | 0.75 | | No special handling |
| 503 | eNB 120A | | 2 | Reduce or omit 5G NR measurements RRC local release |
| 504 | eNB 120A | 1.5 | | No special handling |
| 505 | eNB 120A | 0.5 | | No special handling |
| 506 | eNB 120A | 1 | | No special handling |
| 507 | eNB 120A | 1.5 | | No special handling |
| 508 | eNB 120A | 0.5 | | No special handling |
| 509 | eNB 120A | 0.5 | | No special handling |
| 510 | eNB 120A | 0.5 | | No special handling |

Fig. 5

IDENTIFYING NEW RADIO COVERAGE AVAILABILITY IN NON-STANDALONE MODE

BACKGROUND

A user equipment (UE) may connect to multiple different types of radio access technologies (RATs). Under conventional circumstances, the UE may be unaware of which RATs are available for camping at a particular geographical location. This may cause the UE to operate in an inefficient manner. For example, the UE may be located outside of a coverage area for a particular RAT but still expend power searching for cells belonging to that RAT. In another example, the UE be located within the coverage area for a particular RAT but not currently configured to search for cells belonging to that RAT. As a result, the UE may be unable to camp on the cell despite the cell being available for camping. Accordingly, there is a need for mechanisms that are capable of making the UE aware of which RATs provide coverage for a particular geographical location.

SUMMARY

According to an exemplary embodiment a method is performed at a user equipment (UE) configured to connect to a network that support simultaneous connection to a first radio access technology (RAT) and a second RAT. The method includes receives coverage information associated with the first RAT and a cell of the second RAT, receiving an indication of the current UE location relative to the cell of the second RAT and determining whether the first RAT is available for camping based on the coverage information and the indication of the current UE location relative to the cell of the second RAT.

Further exemplary embodiments relate to a UE that includes a transceiver configured to communicate with a network and a processor configured to perform operations. The operations comprising receiving coverage information associated with the first RAT and a cell of the second RAT, receiving an indication of the current UE location relative to the cell of the second RAT and determining whether the first RAT is available for camping based on the coverage information and the indication of the current UE location relative to the cell of the second RAT.

Still further exemplary embodiments include an integrated circuitry. The integrated circuit includes circuitry configured to receive coverage information associated with a first RAT and a cell of the second RAT, circuitry configured to receive an indication of a current UE location relative to the cell of the second RAT and circuitry configured to determine whether the first RAT is available for camping by a UE based on the coverage information and the indication of the current UE location relative to the cell of the second RAT.

BRIEF DESCRIPTION OF THE DRAWINGS

FIG. 4 shows a method for collecting new radio (NR) coverage information according to various exemplary embodiments.

FIG. 5 shows an example of a 5G NR coverage information database maintained by the NR coverage server according to various exemplary embodiments.

DETAILED DESCRIPTION

Figure 1:
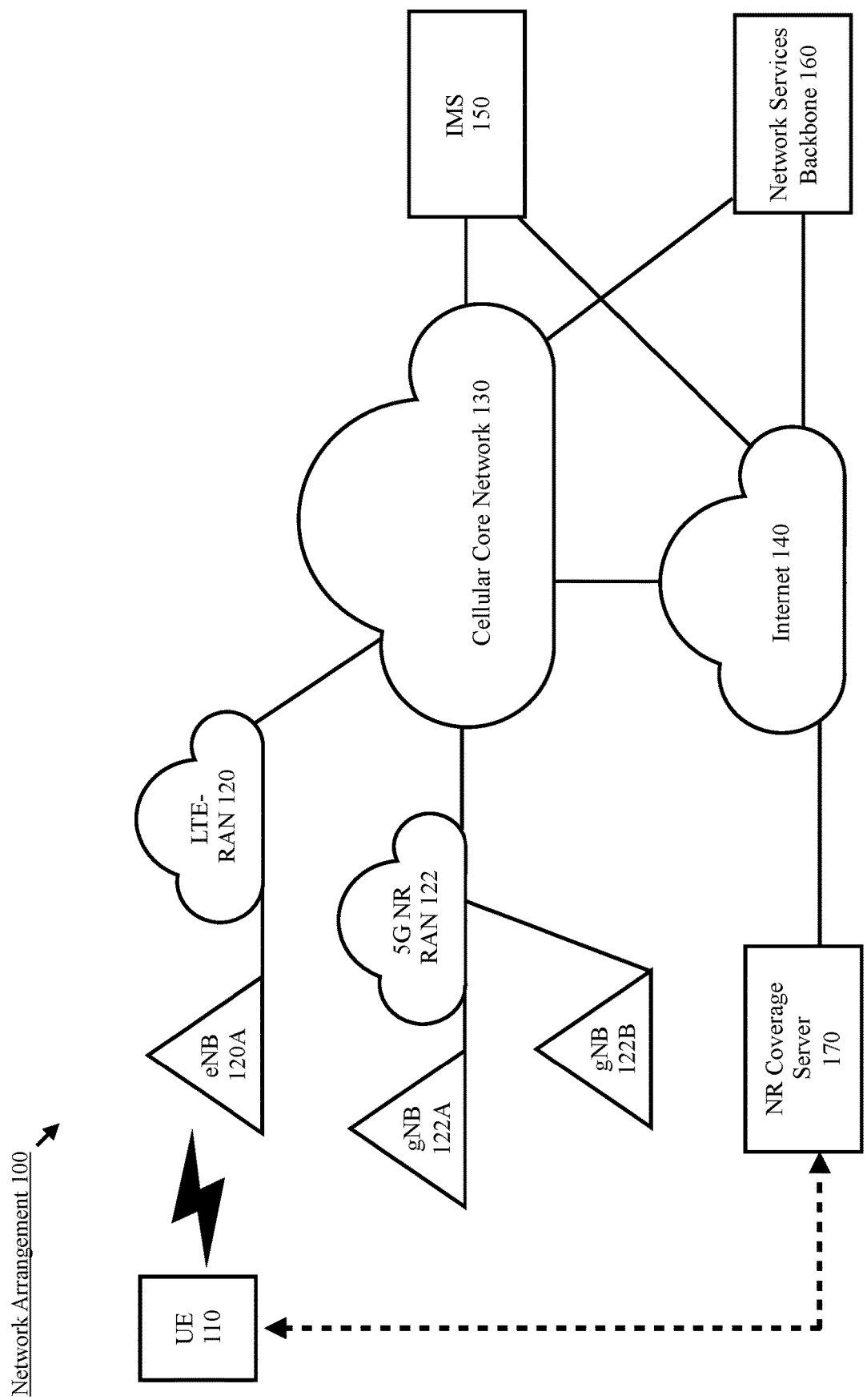
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to identifying which radio access technologies (RATs) provide coverage for a particular geographical location and using this coverage information to provide power and/or performance benefits at a user equipment (UE).

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any electronic component.

The exemplary embodiments are also described with regard to a network that includes a 5G new radio (NR) RAT and a Long Term Evolution (LTE) RAT. Throughout this description, the UE may be characterized as operating in non-standalone (NSA) mode for 5G. In NSA mode, the UE may establish a connection with both the 5G NR RAT and the LTE RAT. This type of configuration may be referred to as LTE-NR dual-connectivity (ENDC). However, any reference to NSA mode, ENDC or a particular RAT is merely provided for illustrative purposes. Different entities may refer to similar concepts by a different name.

When in NSA mode for 5G, the UE may achieve ENDC via a master cell group (MCG) corresponding to LTE and a secondary cell group (SCG) corresponding to 5G NR or vice versa. Each cell group may include at least one cell for a corresponding RAT. In one exemplary scenario of ENDC, from a protocol stack perspective, the UE may have a control plane and a user plane with the 5G NR network while also having a control plane and a user plane with the LTE network. In another exemplary scenario of ENDC, the UE may have a control plane with the LTE network and a user plane with the 5G NR network or vice versa. Thus, when operating in NSA mode for 5G, the UE may have a simultaneous connection to 5G NR and LTE (e.g., ENDC). However, it should be noted, that when operating in NSA mode for 5G, the UE may transition between instances of being connected on one RAT (e.g., 5G NR, LTE, Legacy, etc.) to being connected on multiple RATs (e.g., ENDC). However, the exemplary embodiments are not limited to the protocol stack examples provided above and may apply to NSA mode being enabled in any appropriate manner.

The exemplary embodiments are further described with regard to a deployment scenario in which one or more NR cells have a coverage area that overlaps with the coverage area of an LTE cell. In other words, there may be pockets of 5G NR coverage within the LTE coverage area. However, this exemplary deployment scenario is not intended to limit the exemplary embodiments in any way. Instead, this exemplary deployment scenario is provided to illustrate how i) under conventional circumstances a UE in NSA mode may operate in an inefficient manner and ii) the exemplary techniques described herein may provide a power and performance benefit to the UE. Those skilled in the art will understand that the exemplary concepts described herein are not limited to this type of deployment scenario and may be applicable to any deployment scenario in which the UE is within the general vicinity of two or more RAT coverage areas.

Under conventional circumstances, the UE may be unaware of which RATs are available for camping at a particular geographical location. This may cause the UE to operate in an inefficient manner. For example, within the context of the exemplary deployment scenario referenced above, the UE may be located outside of a 5G NR coverage area. However, the UE may still be configured to search for 5G NR cells to camp on. As a result, the UE may experience an unnecessary power drain. To provide another example, the UE may be configured to perform a search for 5G NR cells during a particular time window. However, after the window expires, the UE may move from a location that does not have 5G NR coverage to a location in which 5G NR coverage is available. As a result, the UE may be unable to camp on a 5G NR cell despite the cell being available for camping.

The exemplary embodiments relate to the UE identifying which RATs provide coverage for a particular geographical location. As will be described below, the UE may identify where 5G NR coverage is available relative to LTE coverage. For example, while camped on an LTE cell the UE may be configured to search for 5G NR cells. The UE may then collect information such as, but not limited to, the cell ID for the LTE cell, the global cell ID (CGI) for the LTE cell, the results of the search for 5G NR cells and an LTE timing advance command. Those skilled in the art will understand that the LTE timing advance command may indicate the distance between the UE and the LTE cell. In some embodiments, this type of coverage information may be stored locally at the UE. In other embodiments, this type of coverage information may be provided to the network by the UE and stored by the network along with similar coverage information collected by other UEs. Regardless of where the coverage information is stored, the UE may use this coverage information in a variety of different ways to improve power consumption and/or performance. For example, the UE may save power by opting out of searching for a 5G NR cell when this coverage information indicates that the UE is located outside of a 5G NR coverage area. This may include identifying that an LTE cell ID and LTE timing advance command indicate that there is no 5G NR coverage at the UE's current geographical location. Specific examples of how this type of coverage information may be collected and utilized to improve power consumption and performance at the UE will be described in detail below.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are an LTE radio access network (LTE-RAN) 120 and a 5G New Radio (NR) radio access network (5G NR-RAN) 122. However, it should be understood that the UE 110 may also communicate with other types of networks (e.g. legacy cellular network, WLAN, etc.) and the UE 110 may also communicate with networks over a wired connection. With regard to the exemplary embodiments, the UE 110 may establish a connection with the 5G NR-RAN 122 and/or the LTE-RAN 120. Therefore, the UE 110 may have both an LTE chipset to communicate with the LTE-RAN 120 and a 5G NR chipset to communication with the 5G NR-RAN 122.

The LTE-RAN 120 and the 5G NR-RAN 122 may be portions of cellular networks that may be deployed by cellular providers (e.g., Verizon, AT&T, Sprint, T-Mobile, etc.). These networks 120 and 122 may include, for example, cells or base stations (Node Bs, eNodeBs, HeNBs, eNBS, gNBs, gNodeBs, macrocells, microcells, small cells, femtocells, hot spots, etc.) that are configured to send and receive traffic from UEs that are equipped with the appropriate cellular chip set.

The use of a separate LTE-RAN 120 and a 5G NR-RAN 122 is merely provided for illustrative purposes. An actual network arrangement may include a radio access network that includes architecture that is capable of providing both 5G NR RAT and LTE RAT services. For example, a next-generations radio access network (NG-RAN) (not pictured) may include a next generation Node B (gNB) that provides 5G NR services and a next generation evolved Node B (ng-eNB) that provides LTE services. The NG-RAN may be connected to at least one of the evolved packet core (EPC) or the 5G core (5GC). Thus, in one exemplary configuration, the UE 110 may achieve ENDC by establishing a connection to at least one cell corresponding to the LTE-RAN 120 and at least one cell corresponding to the 5G NR-RAN 122. In another exemplary configuration, the UE 110 may achieve ENDC by establishing a connection to at least two cells corresponding to the NG-RAN or other type of similar RAN. Accordingly, the example of a separate LTE-RAN 120 and a 5G NR-RAN 122 is merely provided for illustrative purposes.

Returning to the exemplary network arrangement 100, the UE 110 may connect to the LTE-RAN 120 via at the evolved Node B (eNB) 120A. The UE 110 may connect to the 5G NR-RAN 122 via at least one of the next generation Node B (gNB) 122A or gNB 122B. Those skilled in the art will understand that any association procedure may be performed for the UE 110 to connect to the LTE-RAN 120 or the 5G NR-RAN 122. For example, as discussed above, the 5G NR-RAN 122 may be associated with a particular cellular provider where the UE 110 and/or the user thereof has a contract and credential information (e.g., stored on a SIM card). Upon detecting the presence of the 5G NR-RAN 122, the UE 110 may transmit the corresponding credential information to associate with the 5G NR-RAN 122. More specifically, the UE 110 may associate with a specific cell (e.g., the gNB 122A of the 5g NR-RAN 122). Similarly, for access to LTE services, the UE 110 may associate with eNB 120A. However, as mentioned above, the use of the LTE-RAN 120 and the 5G NR-RAN 122 is for illustrative purposes and any appropriate type of RAN may be used.

In addition to the RANs 120 and 122, the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. It may include the EPC and/or the 5GC.

The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

The network arrangement 100 may further include an NR coverage server 170. The NR coverage server 170 may store information received from one or more UEs regarding the location of NR coverage relative to LTE coverage. As indicated above, this information may include but is not limited to, the cell ID for an LTE cell, the global cell ID (CGI) for an LTE cell, the results of the search for a 5G NR cell and an LTE timing advance command. The NR coverage server 170 may be managed by a carrier or another entity (e.g., third-party such as manufacturer of the UE 110, a service provider, etc.). In the example, the NR coverage server 170 is shown as being connected directly to the Internet 140. However, this is merely for illustrative purposes, in an actual network arrangement the NR coverage server 170 may reside in any location in which the NR coverage server 170 may directly or indirectly communicate with the UE 110. Thus, the NR coverage server 170 may be configured with one or more communication interfaces to communicate with other network components and/or UEs. Further, an actual network arrangement may include multiple NR coverage servers. Thus, the example of the single NR coverage server 170 is merely provided for illustrative purposes.

Figure 2:
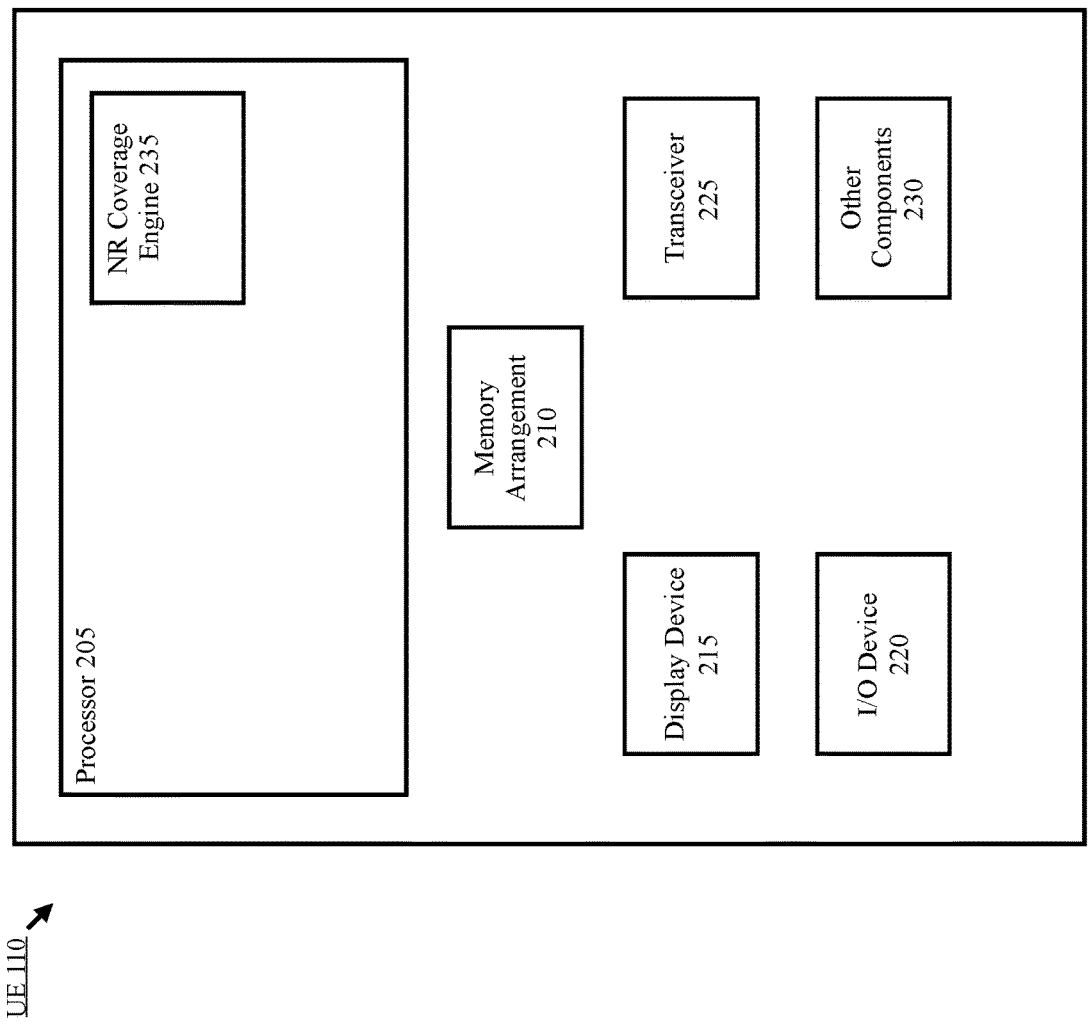
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc.

The processor 205 may be configured to execute a plurality of engines for the UE 110. For example, the engines may include an NR coverage engine 235. In a first aspect, the NR coverage engine 235 may collect information about NR coverage relative to LTE coverage and provide this information to the network (e.g., the NR coverage server 170). In a second aspect, the NR coverage engine 235 may use this coverage information to perform various operations and/or omit the performance of various operations.

The above referenced engines each being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the LTE-RAN 120, the 5G NR-RAN 122 etc. Accordingly, the transceiver 225 may operate on a variety of different frequencies or channels (e.g., set of consecutive frequencies).

Figure 3:
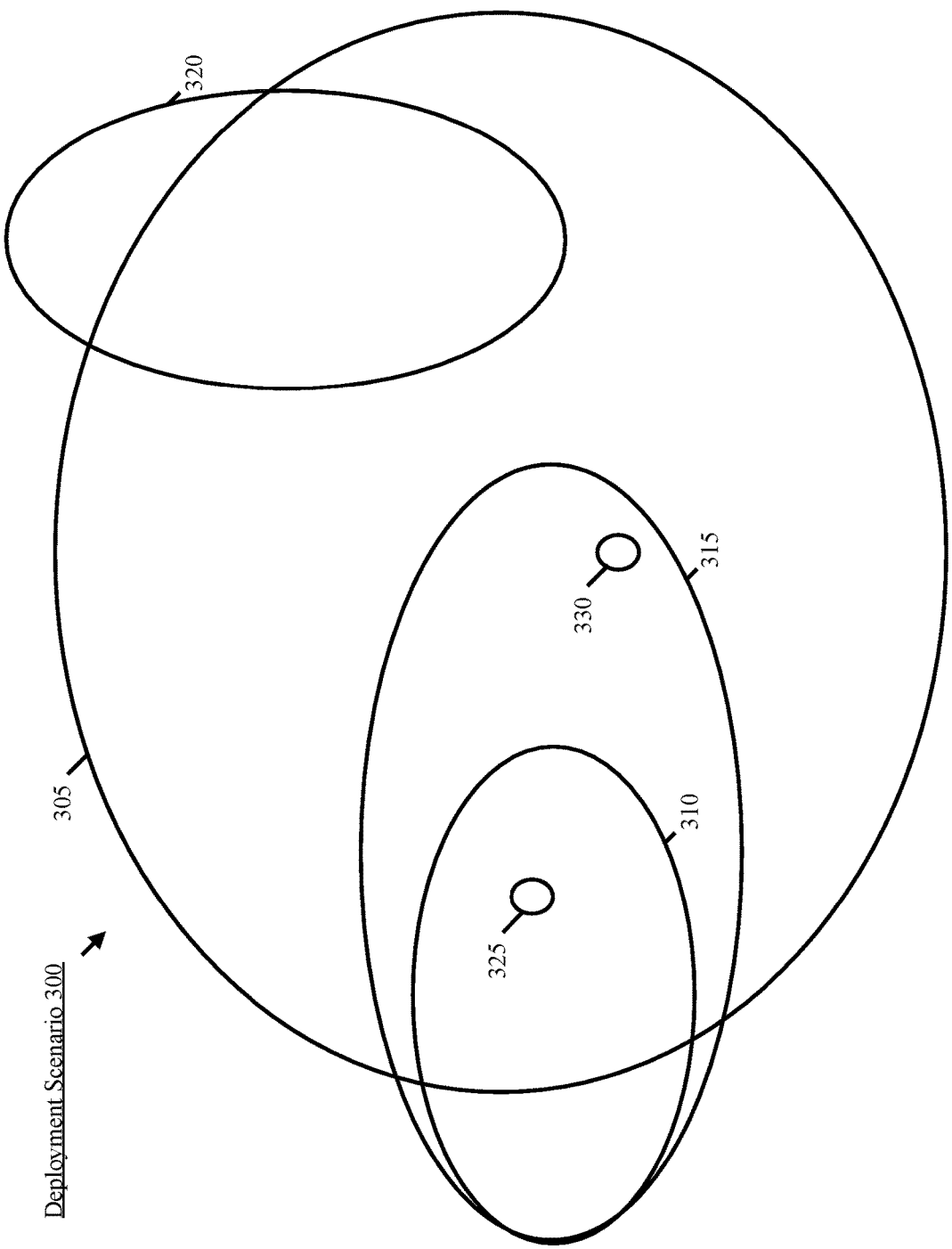
FIG. 3 illustrates an exemplary deployment scenario according to various exemplary embodiments.

FIG. 3 illustrates an exemplary deployment scenario 300 according to various exemplary embodiments. The deployment scenario 300 shows one possible configuration of the exemplary deployment scenario referenced above.

The deployment scenario 300 includes an LTE coverage area 305. For example, an LTE cell (e.g., eNB 120A) may be configured to support NSA mode. Thus, the LTE cell may be deployed with a large coverage area.

The deployment scenario 300 also includes three NR coverages 310-320 that overlap the LTE coverage area 305. In this example, the NR coverage areas 310 operates on frequency range 2 (FR2) and NR coverage areas 315-320 operate on frequency range 1 (FR1). Those skilled in the art will understand that 5G NR may be separated into FR1 that includes sub 6 gigahertz (GHz) frequency bands and FR2 that includes frequency bands between 24 GHz and 53 GHz. Generally, frequency bands in FR2 have a shorter range and a higher available bandwidth compared to frequency bands in FR1. Reference to FR1 and FR2 is merely provided for illustrative purposes and the exemplary embodiments are not limited to any particular arrangement of FR1 and FR2 coverage areas.

Those skilled in the art will understand that 5G NR may utilize beamforming which generally refers to an antenna technique used to transmit/receive a directional signal. Due to the nature of beamforming and the millimeter wave (mmWave) spectrum of 5G, certain locations within a 5G NR coverage area may have no 5G NR coverage. For example, when the UE 110 is located indoors the structure may prevent a 5G NR beam from reaching the UE 110. In the deployment scenario 300, location 325 represents a location within the 5G NR coverage area 310 that does not have 5G NR coverage and location 330 represents a location within the 5G NR coverage area 315 that does not have 5G NR coverage.

FIG. 4 shows a method 400 for collecting NR coverage information according to various exemplary embodiments. The method 400 will be described with regard to the exemplary deployment scenario 300 of FIG. 3, the UE 110 of FIG. 2 and the network arrangement 100 of FIG. 1.

In 405, the UE 110 camps on an LTE cell. For example, consider a scenario in which the UE 110 is operating in NSA mode and camps on the eNB 120A. In this example, the eNB 120A provides the coverage area 305 shown in the deployment scenario 300 of FIG. 3.

In 410, the UE 110 may receive a parameter indicating the UE 110 location relative to the currently camped LTE cell. For example, the UE 110 may receive a timing advance command from the eNB 120A during a random channel access (RACH) procedure, via layer 1 (L1) signaling or via layer 2 (L2) signaling. The timing advance command may be a medium access control (MAC) control element (CE) that includes timing information. The timing information is provided by the network to control the timing of UE 110 uplink signaling to ensure alignment between uplink signaling and subframe timing. However, the timing advance command may also indicate the distance between the UE 110 and the eNB 120A. Thus, it may be leveraged in this example to serve as an indication of the UE 110 location relative to the eNB 120A. However, reference to the timing advance command is merely provided for illustrative purposes and any appropriate indication of the location of the UE 110 relative to the LTE cell may be utilized, e.g., GPS location, WLAN location, etc.

In 415, the UE 110 may receive measurement configuration information. For example, the UE 110 and the eNB 120A may establish a radio resource control (RRC) connection. During RRC signaling, the network may request that the UE 110 provide a measurement report if certain conditions are satisfied. In this example, the network may request that the UE 110 provide a measurement report if a B1 event occurs. Those skilled in the art will understand that a B1 event is one of multiple different types of events the UE 110 may be configured to monitor and relates to whether a parameter corresponding to a 5G NR cell satisfies a threshold value. The parameter may be reference signal receive power (RSRP), reference signal receive quality (RSRQ), signal-to-interference-to-noise ratio (SINR) or any other appropriate parameter.

In 420, the UE 110 may search for 5G NR cells in accordance with the measurement configuration information. For example, the UE 110 may be configured with gap measurements during which the UE 110 may tune away from the LTE cell and scan various frequencies for the existence of available 5G NR cells. In some embodiments, the network may configure the UE 110 with a limited time window to search for 5G NR neighbor cells.

If the B1 event threshold is satisfied, this may indicate to the UE 110 that there is a 5G NR neighbor cell within the vicinity of the UE 110. If the B1 event threshold is not satisfied, this may indicate to the UE 110 that there is no 5G NR coverage at this location.

The UE 110 may provide the measurement report to the network if the B1 event threshold is satisfied. However, it is up to the network to decide how to respond to the measurement report. For example, the network may add the 5G NR cell to configure ENDC at the UE 110, handover the UE 110 from the LTE cell to the 5G NR cell or not utilize the 5G NR cell to communicate with the UE 110. How the network responds to the measurement report is beyond the scope of the exemplary embodiments. Instead, the exemplary embodiments are directed towards identifying the existence of 5G NR coverage (e.g., B1 event). As will be described in more detail below, the UE 110 may decide to omit searching for 5G NR cells if the UE 110 previously determined that the currently camped LTE cell ID and the timing advance command value indicated that there was no 5G NR coverage at this location. This may provide power saving benefits at the UE 110.

In 425, the UE 110 stores 5G NR coverage information. For example, the UE 110 may maintain a database locally at the UE 110 that includes a cell ID (or CGI) corresponding to the currently camped LTE cell, the timing advance command value received from the currently camped LTE cell, an indication of whether the B1 event occurred (or SCG/NR addition was successful), and the relevant frequency range (e.g., FR1 or FR2). The UE 110 may also store an explicit indication as to whether 5G NR coverage was detected and/or whether SCG/NR addition was successful.

In 430, the UE 110 may transmit 5G NR coverage information to the NR coverage server 170. For example, the UE 110 and other UEs may provide this type of coverage information (e.g., cell ID, timing advanced command value, B1 event threshold satisfied, etc.) to the NR coverage server 170 using an IP based message. As will be described below, the NR coverage server 170 may also maintain a database of this type of coverage information. However, the exemplary embodiments are not limited to any particular type of message or delivery mechanism, a UE may provide coverage information to the NR coverage server 170 in any appropriate manner. Subsequently, the method 400 ends.

FIG. 5 shows an example of a 5G NR coverage information database 500 maintained by the NR coverage server 170 according to various exemplary embodiments. In this example, each row 501-510 indicates an instance in which 5G NR coverage information is received from a UE. A will be described below, each row except for row 503 is provided by a UE that identified 5G NR coverage. The exemplary embodiments are not limited to any particular number of entries and the 5G NR coverage information database may include any appropriate number of entries.

The database 500 includes a first column 505 that indicates a cell ID (or CGI) for an LTE cell. In this example, each entry is column 505 is for the eNB 120A.

The database 500 also includes a second column 510 that indicates a timing advance command value associated with a B1 event. In other embodiments, instead of or in addition to the B1 event, the timing advance command value may be associated with an indication of successful SCG/NR addition. As indicated above, the B1 event relates to when the UE 110 determines that measurement data corresponding to a neighbor cell satisfies a threshold value. Successful SCG/NR addition relates to a procedure initiated on the network side in response to a measurement report indicating the B1 event. Thus, while these statistics are similar, they may provide different insights into UE 110 behavior and behavior.

As mentioned above, in this example, only row 503 is associated with a UE that was unable to detect 5G NR coverage while camped on the eNB 120A. Thus, each row except for row 503 includes a value in column 510. The database 500 also includes a third column 515 that indicates a timing advance command value associated with no B1 event. Only row 503 has a value in column 515 because only row 503 is associated with a UE that was unable to detect 5G NR coverage while camped on the eNB 120A. Here, the timing advance command values fluctuate between 0.5 and 2. However, this is merely provided or illustrative purposes and is not intended to limit the exemplary embodiments in any way.

The database 500 further includes a fourth column 520 that indicates an action to be taken by a UE. Rows 501, 502 and 504-510 each indicate no special handling is to take place because each of these timing advance command values are associated with 5G NR coverage relative to the eNB 120A. Row 503 indicates an action that is to be taken because this timing advance command value is associated with no 5G NR coverage. In this example, one action relates to reducing or omitting 5G NR measurements. This allows the UE 110 to save power by forgoing measurements at a location where 5G NR coverage is unlikely. Another action relates to resetting the LTE RRC connection. This may include, the UE 110 releasing the LTE RRC connection. The UE 110 may then establish an RRC connection with the previously camped LTE cell (or any other LTE cell that supports NSA mode). Since the UE 110 knows this location is associated with 5G NR coverage, the UE 110 anticipates that the B1 event configuration information receiving during the LTE RRC reset will lead to the UE 110 camping on the 5G NR RAT. However, these examples are merely provided for illustrative purposes. The exemplary embodiments are applicable to any appropriate type of action.

The NR coverage server 170 may determine a timing advance command value threshold for a particular LTE cell based on the information collected from the multiple UEs. The network may provide an indication of this threshold to connected UEs. For example, the network may provide the UE 110 with the timing advance command value threshold corresponding to an LTE cell ID. If the UE 110 determines that the timing advanced command received from an LTE cell with that LTE cell ID exceeds the timing advance command value threshold, the UE 110 may assume that there is no 5G NR coverage at the current UE 110 location. As a result, the UE 110 may save power by reducing or omitting 5G NR measurements since it is unlikely for 5G NR coverage to be present at a location associated with a timing advance command value that exceeds the timing advance command threshold.

Figure 6:
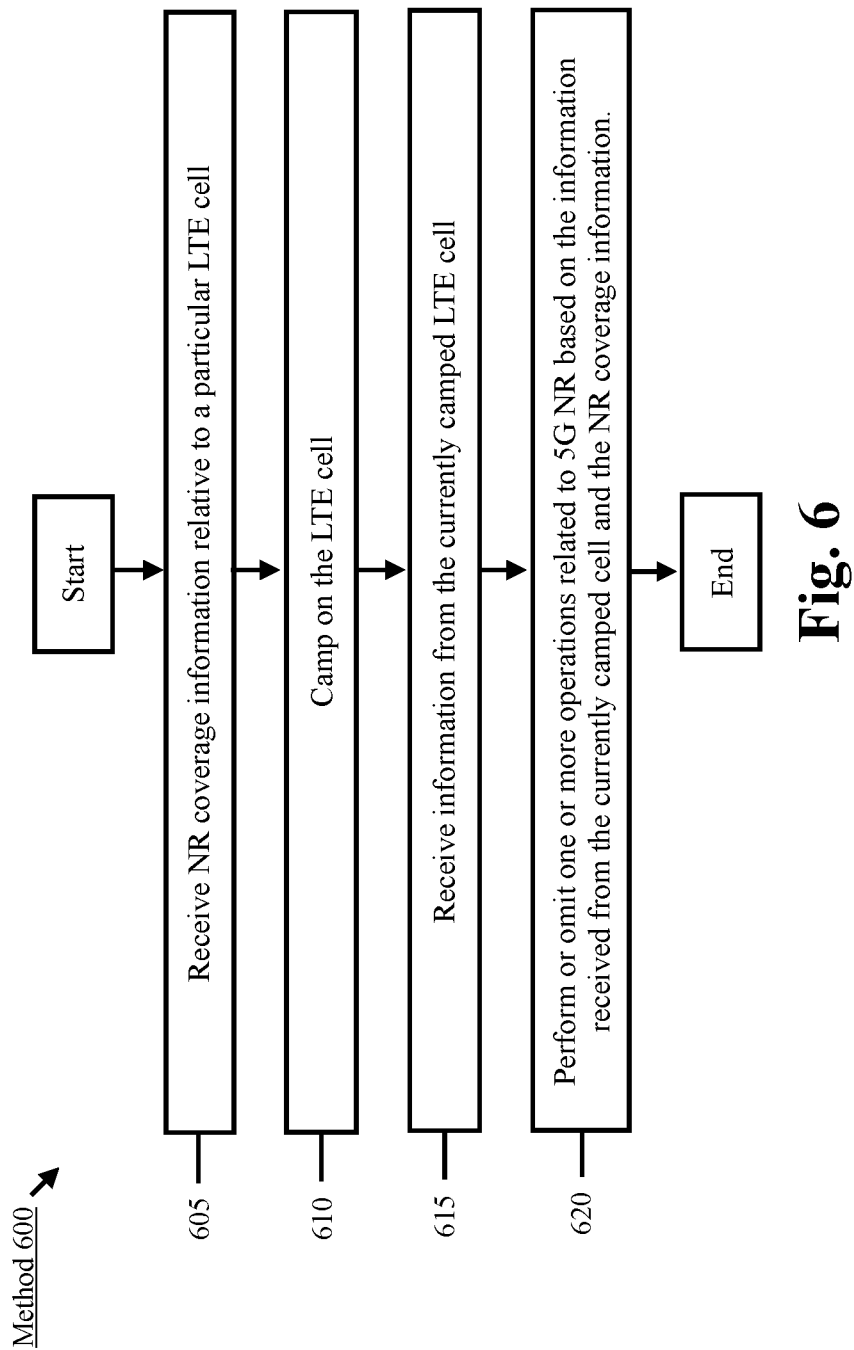
FIG. 6 shows a method for the UE 110 to perform an action on the basis of NR coverage information according to various exemplary embodiments.

FIG. 6 shows a method 600 for the UE 110 to perform an action on the basis of NR coverage information according to various exemplary embodiments.

In 605, the UE 110 receives NR coverage information relative to a particular LTE cell. In this example, the NR coverage information is associated with the eNB 120A. In some embodiments, NR coverage information may be collected by the UE 110 and stored locally at the UE 110. Thus, the NR coverage engine 235 may receive this information from the memory arrangement 210. In other embodiments, NR coverage information may be received from the network (e.g., NR coverage server 170 or any other appropriate network component).

As indicated above, NR coverage information may include information such as, but not limited to, an LTE cell ID (or CGI), one or more timing advance command values associated with a particular LTE cell, an indication of a successful B1 event, an indication of successful SCG/NR addition, a SIB2 upper layer indication and a timing advance command value threshold associated with a particular LTE cell.

In 610, the UE 110 camps on an LTE cell. For example, consider a scenario in which the UE 110 is operating in NSA mode and camps on the eNB 120A. In this example, the eNB 120A provides the coverage area 305 shown in the deployment scenario 300 of FIG. 3.

In 615, the UE 110 receives information from the currently camped LTE cell. For example, the UE 110 may receive a system information block (SIB) indicating a cell ID of the currently camped cell. In another example, the UE 110 may receive a timing advance command value from the currently camped cell during a RACH procedure.

In 620, the UE 110 perform or omit one or more operations related to 5G NR based on the information received from the currently camped cell and the 5G NR coverage information.

As indicated above, in some embodiments the UE 110 may determine to perform operations in accordance with normal operating procedure. For example, if the UE 110 determines that the current location relative to the eNB 120A supports 5G NR coverage then no special handling is to take place.

In other embodiments, if the UE 110 determines that the current location relative to the eNB 120A does not support 5G NR coverage, then the UE 110 may implement a variety of different exemplary techniques that may provide a power and/or performance benefit to the UE 110. Specific examples of these exemplary techniques are described below.

As mentioned above, the UE 110 may be configured to monitor for a B1 event during a limited time window. Under conventional circumstances, when this time window expires the UE 110 may be stuck camped on the LTE cell. For example, the UE 110 may receive B1 measurement configuration information when the UE 110 is located outside of coverage areas 310-320 or when located within 325 or 330. If the B1 event time window expires before the UE 110 enters one of the 5G NR coverage areas 310-320, then the UE 110 may not search for 5G NR cells even though the UE 110 is located within one of the 5G NR coverage areas 310-320.

One exemplary technique is directed towards a scenario in which the UE 110 is stuck camping on the LTE cell. If the UE 110 identifies that the information received from the currently camped LTE cell and the NR coverage information indicate that the UE 110 is located within a 5G NR coverage area and there is no B1 measurement configuration information available, the UE 110 may reset the LTE RRC connection. For example, the UE 110 may release the RRC connection locally at the UE 110. The UE 110 may then perform RRC establishment with the previously camped LTE cell (or any other LTE cell that support NSA mode) to receive new B1 measurement configuration information. In other words, the UE 110 may reset the LTE RRC connection to receive information from the network (e.g., B1 measurement configuration information) that causes the UE 110 to perform a 5G NR neighbor cell search.

Another exemplary technique is directed towards reducing or omitting the performance of B1 measurements when the UE 110 identifies that there is likely no 5G NR coverage at the UE 110 current location. It would be an inefficient use of the UE 110 limited power supply to perform a search for 5G NR coverage when the UE 110 has determined that 5G NR coverage is unlikely to be found at the current location. Thus, the UE 110 may omit searching for 5G NR cells during one or more measurement gaps. In some embodiments, the UE 110 may omit each measurement gap configured during the B1 time window to maximize power saving benefits. In other embodiments, the UE 110 may still search for 5G NR coverage during one or more measurement gaps to ensure that NR coverage information received in 605 is still accurate.

The exemplary techniques are not limited to performing or omitting measurements. For example, under conventional circumstance, the UE 110 may display a 5G icon based on receiving a SIB 2 indication from the currently camped LTE cell that supports NSA mode. However, since there may only be pockets of 5G NR coverage within the LTE coverage area, the SIB 2 may cause the UE 110 to display the 5G icon when the UE is located within the LTE coverage area but not in 5G NR coverage. This may negatively impact the user experience because it may cause the user to think they have access 5G NR service when it is actually not available. Accordingly, one exemplary technique may be to display a 5G icon on the display device 215 of the UE 110 based on the information received from the currently camped cell and the 5G NR coverage information.

Another exemplary technique relates to the application processor using the 5G NR coverage information to make decision for any of a variety of different operations. For example, under conventional circumstances, the application processor is not aware of the actual 5G NR coverage. As a result, the application processor may select a parameter (e.g., codec, data channel, etc.) under the assumption that 5G NR coverage is present or vice versa. The exemplary embodiments may overcome this conventional issue by incorporating the exemplary 5G NR coverage information into their decision making processes. Thus, depending on an application's need or preference, the application processor may use the exemplary 5G NR coverage information to make selections regarding parameters such as throughput, latency, power cost efficiency, code, data channel, etc.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A method, comprising:
   at a user equipment (UE) configured to connect to a network that supports simultaneous connection to a first radio access technology (RAT) and a second RAT:
   receiving coverage information associated with the first RAT and a cell of the second RAT, wherein the first RAT and the second RAT are different RATs, wherein the coverage information includes information received from the cell of the second RAT and further includes information generated by the UE, wherein the information received from the cell of the second RAT includes a global cell ID (CGI);
   receiving a timing advance command value from the cell of the second RAT during a random channel access (RACH) procedure, wherein the timing advance command value indicates a current UE location relative to the cell of the second RAT; and
   determining whether the first RAT is available for camping based on the coverage information and the timing advance command value received from the cell of the second RAT.

2. The method of claim 1, wherein the coverage information includes an indication of a timing advance command value threshold.

3. The method of claim 2, wherein the timing advance command value threshold is based on information generated by multiple UEs.

4. The method of claim 1, further comprising:
   receiving measurement configuration information related to searching for a cell of the first RAT, wherein the measurement configuration information includes multiple measurement gaps.

5. The method of claim 4, wherein the UE omits utilizing one or more measurement gaps when the first RAT is not available for camping.

6. The method of claim 1, further comprising:
   when the first RAT is available for camping, displaying an icon indicating that access to services of the first RAT are available based on the coverage information and the indication of the UE current location relative to the cell of the second RAT.

7. The method of claim 1, further comprising:
   when the first RAT is available for camping, transmitting a radio resource control (RRC) signal to the cell of the second RAT.

8. The method of claim 7, further comprising:
   receiving, in response to the RRC signal, measurement configuration information related to searching for a cell of the first RAT.

9. The method of claim 1, wherein the first RAT is a 5G new radio (NR) RAT and the second RAT is a long term evolution (LTE) RAT.

10. A user equipment (UE), comprising:
    a transceiver configured to communicate with a network; and
    a processor configured to perform operations, the operations comprising:
    receiving coverage information associated with the first RAT and a cell of the second RAT, wherein the first RAT and the second RAT are different RATs, wherein the coverage information includes information received from the cell of the second RAT and further includes information generated by the UE, wherein the information received from the cell of the second RAT includes a global cell ID (CGI);
    receiving a timing advance command value from the cell of the second RAT during a random channel access (RACH) procedure, wherein the timing advance command value indicates a current UE location relative to the cell of the second RAT; and
    determining whether the first RAT is available for camping based on the coverage information and the timing advance command value received from the cell of the second RAT.

11. The UE of claim 10, wherein the coverage information includes an indication of a timing advance command value threshold.

12. The UE of claim 10, the operations further comprising:
    receiving measurement configuration information related to searching for a cell of the first RAT, wherein the measurement configuration information includes multiple measurement gaps and wherein the UE omits utilizing one or more of the multiple measurement gaps when the first RAT is not available for camping.

13. An integrated circuit, comprising:

circuitry configured to receive coverage information associated with a first RAT and a cell of the second RAT, wherein the first RAT and the second RAT are different RATs, wherein the coverage information includes information received from the cell of the second RAT and further includes information generated by the UE, wherein the information received from the cell of the second RAT includes a global cell ID (CGI);

circuitry configured to receive a timing advance command value from the cell of the second RAT during a random channel access (RACH) procedure, wherein the timing advance command value indicates a current UE location relative to the cell of the second RAT; and circuitry configured to determine whether the first RAT is available for camping by a UE based on the coverage information and the timing advance command value received from the cell of the second RAT.

14. The integrated circuit of claim 13, wherein the coverage information includes an indication of a timing advance command value threshold.

15. The integrated circuit of claim 13, further comprising:

circuitry configured to receive measurement configuration information related to searching for a cell of the first RAT, wherein the measurement configuration information includes multiple measurement gaps and wherein the UE omits utilizing one or more of the multiple measurement gaps when the first RAT is not available for camping.

* * * * *